(12) United States Patent
Mishra, I et al.

(10) Patent No.: US 10,635,455 B2
(45) Date of Patent: Apr. 28, 2020

(54) SIMPLIFYING UNDERSTANDING OF PROCEDURE DEPENDENCIES IN A FORM DEFINITION

(75) Inventors: Amulya Mishra, I, Hyderabad (IN); Alan Fothergill, II, Half Moon Bay, CA (US); Oliver Steinmeier, III, San Mateo, CA (US); Kenichi Mizuta, IV, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2225 days.

(21) Appl. No.: 11/674,152

(22) Filed: Feb. 13, 2007

(65) Prior Publication Data
US 2008/0195929 A1  Aug. 14, 2008

(51) Int. Cl.
*G06F 9/451* (2018.01)

(52) U.S. Cl.
CPC .................... *G06F 9/451* (2018.02)

(58) Field of Classification Search
CPC .... G06F 17/243; G06F 17/00; G06F 17/2288; G06F 17/211; G06F 17/30905; G06F 17/24; G06F 17/212; G06F 17/2247; G06F 9/4443
USPC ....... 715/221, 222, 224, 243, 249, 253, 277, 715/223
See application file for complete search history.

(56) References Cited

U.S. PATENT DOCUMENTS

| | | | |
|---|---|---|---|
| 5,519,866 A * | 5/1996 | Lawrence et al. | 717/162 |
| 5,657,211 A * | 8/1997 | Brockmann | 363/16 |
| 5,701,489 A * | 12/1997 | Bates | G06F 8/4436 717/144 |
| 5,745,712 A * | 4/1998 | Turpin et al. | 715/763 |
| 5,815,830 A * | 9/1998 | Anthony | 707/6 |
| RE36,422 E * | 11/1999 | Pazel | 715/804 |
| 6,490,601 B1 * | 12/2002 | Markus et al. | 715/207 |
| 6,507,726 B1 * | 1/2003 | Atkinson | G09B 7/02 434/307 R |
| 6,589,290 B1 * | 7/2003 | Maxwell et al. | 715/224 |
| 6,748,425 B1 * | 6/2004 | Duffy et al. | 709/217 |
| 7,174,536 B1 * | 2/2007 | Kothari | G06F 11/3664 717/105 |
| 7,333,966 B2 * | 2/2008 | Dozier | G06F 17/30014 235/435 |
| 7,376,891 B2 * | 5/2008 | Hitchock | G06F 17/243 715/221 |
| 7,475,333 B2 * | 1/2009 | Otter et al. | 715/222 |
| 7,496,837 B1 * | 2/2009 | Larcheveque et al. | 715/237 |
| 7,584,417 B2 * | 9/2009 | Friend | G06F 21/31 715/221 |

(Continued)

*Primary Examiner* — Manglesh M Patel
*Assistant Examiner* — Nicholas Hasty
(74) *Attorney, Agent, or Firm* — IPHORIZONS PLLC; Narendra Reddy Thappeta

(57) ABSTRACT

Simplifying understanding of procedure dependencies in a form definition used in user interfaces. In an embodiment, a form definition including a set of procedures (identified by a corresponding identifier) are examined to determine pairs of procedures such that a caller procedure of a pair invokes/refers a called procedure in the pair. For each of pair of procedures determined, a link associated with an identifier identifying the called procedure is included in the caller procedure. The link is designed to display the called procedure in response to a user action associated with the identifier in a display of the caller procedure.

18 Claims, 12 Drawing Sheets

(56) References Cited

U.S. PATENT DOCUMENTS

| | | | | |
|---|---|---|---|---|
| 7,610,548 B1* | 10/2009 | Brinkman et al. | | 715/221 |
| 2002/0156809 A1* | 10/2002 | O'Brien | | 707/505 |
| 2005/0108625 A1* | 5/2005 | Bhogal et al. | | 715/505 |
| 2006/0136810 A1* | 6/2006 | Truong et al. | | 715/507 |
| 2007/0005342 A1* | 1/2007 | Ortscheid | | G06F 8/33 |
| | | | | 704/9 |
| 2007/0033116 A1* | 2/2007 | Murray | | G06F 17/243 |
| | | | | 705/31 |

* cited by examiner

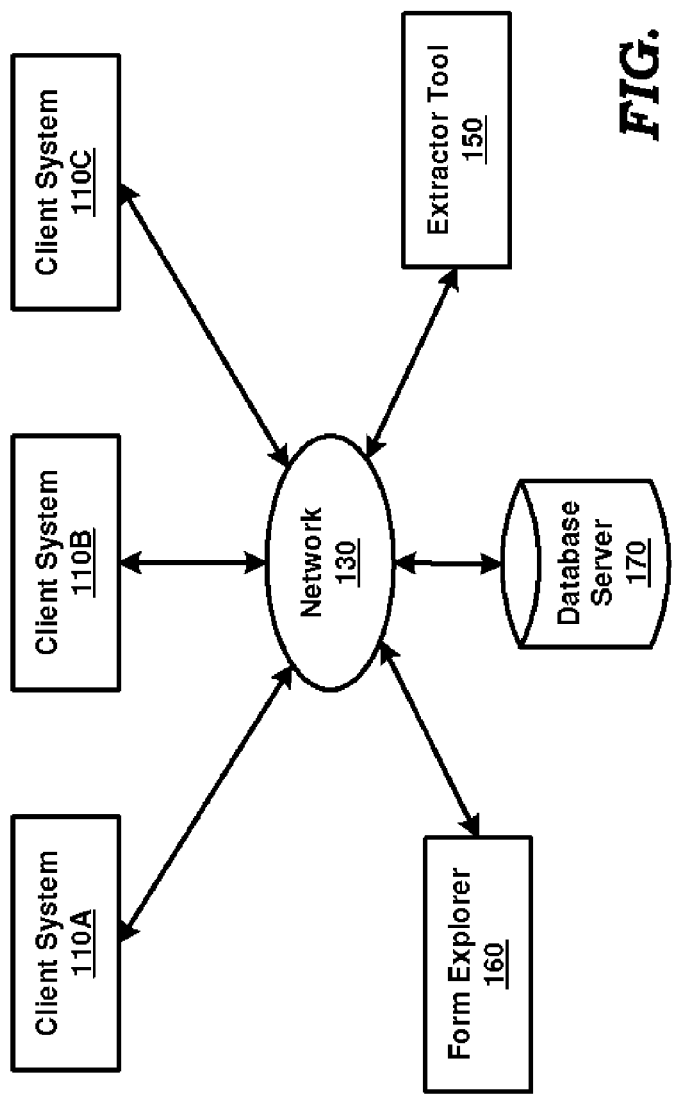

```
Form Designer
Object Navigator
 File    Edit    View    Tools    Help

APPFLOR
        ARXTWUTL
        ARXSUCOM
    Data Blocks
    Canvases
    Editors
    LOVs
    Object Groups
    Parameters
    Popup Menus
    Program Units
        APP_CUSTOM (Package Spec)
        APP_CUSTOM (Package Body)
        CGS$WHEN_NEW_FORM_INSTANCE (Procedure Body)
        CGBS$MESSAGE_QUERY_MODE (Procedure Body)
        ............
        ............
    Triggers
        POST-FORM
        PRE-FORM
        ON-ERROR
        WHEN-NEW-FORM-INSTANCE
        WHEN-NEW-RECORD-INSTANCE
        WHEN-NEW-ITEM-INSTANCE
        WHEN-NEW-BLOCK-INSTANCE
        QUERY_FIND
        CLOSE_WINDOW
        ACCEPT Mod: RAXSUTRM            File: RAXSUTRM.fmb
```

```
  Edit    Debug

/* CG$WHEN_NEW_FORM_INSTANCE */
PROCEDURE CG$WHEN_NEW_FORM_INSTANCE IS
BEGIN
/* CGPR$DEFAULT_CTX_GLOBAL */
BEGIN
    copy('N','GLOBAL.CG$DO_AUTO_QUERY');
END;
/* CGBS$STARTUP */
BEGIN
    default_value('A','GLOBAL.CG$QUERY_MODE');
    CGBS$SET_RELATIONS(:GLOBAL.CG$QUERY_MODE);
    CGBS$SET_QUERY_MODE(:GLOBAL.CG$QUERY_MODE);
END;
END;
```
360

*FIG. 3B*

| FORM_ID | FORM_NAME | TRIGGER_NAME | ORIGINAL_TRIGGER_TEXT | MARKEDUP_TRIGGER_TEXT |
|---|---|---|---|---|
| 13910 | RAXSUTRM | WHEN-NEW-FORM-INSTANCE | FDRCSID(\$Header: RAXSUTRM fmb 120.11 2006/01/20 13:54 jypandey ship\$');APP_STANDARD_EVENT('WHEN-NEW-FORM-INSTANCE');global.application_id := to_number(fnd_profile.value('PROG_APPL_ID')) /* CGGN\$CALL_GENERATOR_CODE */ /* Execute the WHEN-NEW-FORM-INSTANCE code that was created by Forms Generator */ BEGIN CGBS2\$.SET_COORD_STYLE('P'); CGBS2\$.SET_QRY_ON_ENTRY('Y'); BEGIN CG\$WHEN_NEW_FORM_INSTANCE; EXCEPTION WHEN OTHERS THEN CGTE\$OTHER_EXCEPTIONS; END;END; | <a class="proglink" href=FormExtractionUIMain?page=singleAttachedLib&formId=13910&Name=CHYCOMSG#FDRCSID>FDRCSID</a>('\$Header: RAXSUTRM fmb 120.11 2006/01/20 13:54 jypandey ship\$');<a class="proglink" href=FormExtractionUIMain?page=singleAttachedLib&formId=13910&Name=APPCORE#APP_STANDARD_EVENT>APP_STANDARD_EVENT</a>('WHEN-NEW-FORM-INSTANCE');global.application_id := to_number(<a class="proglink" href=FormExtractionUIMain?page=singleAttachedLib&formId=13910&Name=FNDSQF#FND_PROFILE.VALUE>fnd_profile.value</a>('PROG_APPL_ID')) /* CGGN\$CALL_GENERATOR_CODE */ /* Execute the WHEN-NEW-FORM-INSTANCE code that was created by Forms Generator */ BEGIN <a class="proglink" href=FormExtractionUIMain?page=singleAttachedLib&formId=13910&Name=ARXSUCOM#CGBS2\$.SET_COORD_STYLE>CGBS2\$.SET_COORD_STYLE</a>('P'); <a class="proglink" href=FormExtractionUIMain?page=singleAttachedLib&formId=13910&Name=ARXSUCOM#CGBS2\$.SET_QRY_ON_ENTRY>CGBS2\$.SET_QRY_ON_ENTRY</a>('Y'); BEGIN <a class="proglink" href=FormExtractionUIMain?page=singleProgramUnit&formId=13910&programUnitId=54245&programUnitName=CG\$WHEN_NEW_FORM_INSTANCE>CG\$WHEN_NEW_FORM_INSTANCE</a>; EXCEPTION WHEN OTHERS THEN <a class="proglink" href=FormExtractionUIMain?page=singleAttachedLib&formId=13910&Name=ARXSUCOM#CGTE\$OTHER_EXCEPTIONS>CGTE\$OTHER_EXCEPTIONS</a>; END;END; |

FIG. 5A

| | FORM_ID 510 | FORM_NAME 520 | TRIGGER_NAME 530 | ORIGINAL_TRIGGER_TEXT 540 | MARKEDUP_TRIGGER_TEXT 550 |
|---|---|---|---|---|---|
| 570 | 13910 | RAXSUTRM | CG$WHEN-NEW-FORM-INSTANCE | /* CG$WHEN_NEW_FORM_INSTANCE */ PROCEDURE CG$WHEN_NEW_FORM_INSTANCE IS BEGIN /* CGPR$DEFAULT_CTX_GLOBAL */ BEGIN copy('N','GLOBAL.CG$DO_AUTO_QUERY');END;/* CG$STARTUP */BEGIN default_value('A','GLOBAL.CG$QUERY_MODE'); CG$$.SET_RELATIONS( GLOBAL.CG$QUERY_MODE ); CG$$.SET_QUERY_MODE( GLOBAL.CG$QUERY_MODE );END;END; | /* CG$WHEN_NEW_FORM_INSTANCE */</font><font class="FoxPackageProcedureComment">PROCEDURE </font><a class="proglink" name="CG$WHEN_NEW_FORM_INSTANCE CG"><font class="FoxPackageProcedureComment">CG</font></a>$WHEN_NEW_FORM_INSTANCE IS BEGIN/* CGPR$DEFAULT_CTX_GLOBAL */ BEGIN copy('N','GLOBAL.CG$DO_AUTO_QUERY');END;/* CG$STARTUP */BEGIN default_value('A', 'GLOBAL.CG$QUERY_MODE'); <a class="proglink" href=FormExtractionUIMain?page=singleAttachedLibPackage&Name=ARXSUCOM&UnitName=CG$$#CG$$.SET_RELATIONS>CG$$.SET_RELATIONS</a>( GLOBAL.CG$QUERY_MODE); <a class="proglink" href=FormExtractionUIMain?page=singleProgramUnit&formId=16315&programUnitId=84522&programUnitName=CG$$.SET_QUERY_MODE&programUnitType=#CG$$.SET_QUERY_MODE>CG$$.SET_QUERY_MODE</a>('GLOBAL.CG$QUERY_MODE' );END;END; |
| 580 | 13910 | RAXSUTRM | WHEN-NEW-BLOCK-INSTANCE | APP_STANDARD.EVENT('WHEN-NEW-BLOCK-INSTANCE');/* CG$WHEN_NEW_BLOCK_INSTANCE */ ensure the current canvas is correctly coordinated */BEGIN CG$$.NEW_BLOCK( SYSTEM.CURSOR_BLOCK, GLOBAL.CG$QUERY_MODE);END; | <a class="proglink" href=FormExtractionUIMain?page=singleAttachedLib&formId=13910&Name=APPCORE#APP_STANDARD.EVENT>APP_STANDARD.EVENT</a>('WHEN-NEW-BLOCK-INSTANCE');/* CG$WHEN_NEW_BLOCK_INSTANCE */ ensure the current canvas is correctly coordinated */BEGIN <a class="proglink" href=FormExtractionUIMain?page=singleAttachedLib&formId=13910&Name=ARXSUCOM#CG$$.NEW_BLOCK>CG$$.NEW_BLOCK</a>( SYSTEM.CURSOR_BLOCK, GLOBAL.CG$QUERY_MODE);END; |

*FIG. 5B*

SIMPLIFYING UNDERSTANDING OF PROCEDURE DEPENDENCIES IN A FORM DEFINITION

BACKGROUND

1. Technical Field

The present disclosure relates to user interfaces in digital processing systems and more specifically to a method and apparatus for simplifying understanding of procedure dependencies in a form definition used in user interfaces.

2. Related Art

A form generally refers to a user interface provided to a user by virtue of displaying an image on a display screen. Forms generally provide a convenient mechanism by which information can be displayed to and data received from a user. The information displayed in a form can be received from various sources such as the same system on which the form is displayed, web servers, data servers, or any digital processing systems, in general. Similarly, the data received from a form can be sent to various systems for further processing and/or storing.

A form definition refers to data specifying one or more aspects of a form such as the content (including attributes such as color, font, text, etc.) of various portions of the image displayed (for the form), the manner in which such content can be generated, the manner in which a user may interact with various portions of the image, actions to be performed during the interaction, etc.

A procedure in a form definition contains a group of software instructions that is to be executed, and is identified by an identifier. The form definition may also specify the conditions (e.g., in response to a specific user action, events occurring associated with the form) under which the procedure is to be executed.

Procedures often contain software instructions that invoke/refer other procedures contained in a form definition. The invoking/referring procedure is termed as a caller procedure, the invoked/referred procedure is termed as a called procedure, and the caller procedure is said to depend on the called procedure.

BRIEF DESCRIPTION OF THE DRAWINGS

The present invention will be described with reference to the accompanying drawings briefly described below.

FIG. 1 is a block diagram illustrating an example environment in which various aspects of the present invention can be implemented.

FIGS. 3B, 3C and 3D each depict the software instructions constituting a procedure (group of instructions) associated with a form definition in an embodiment.

FIGS. 5A and 5B together depict the procedures in a form definition and the corresponding modified procedures stored in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Overview

Figure 2A:
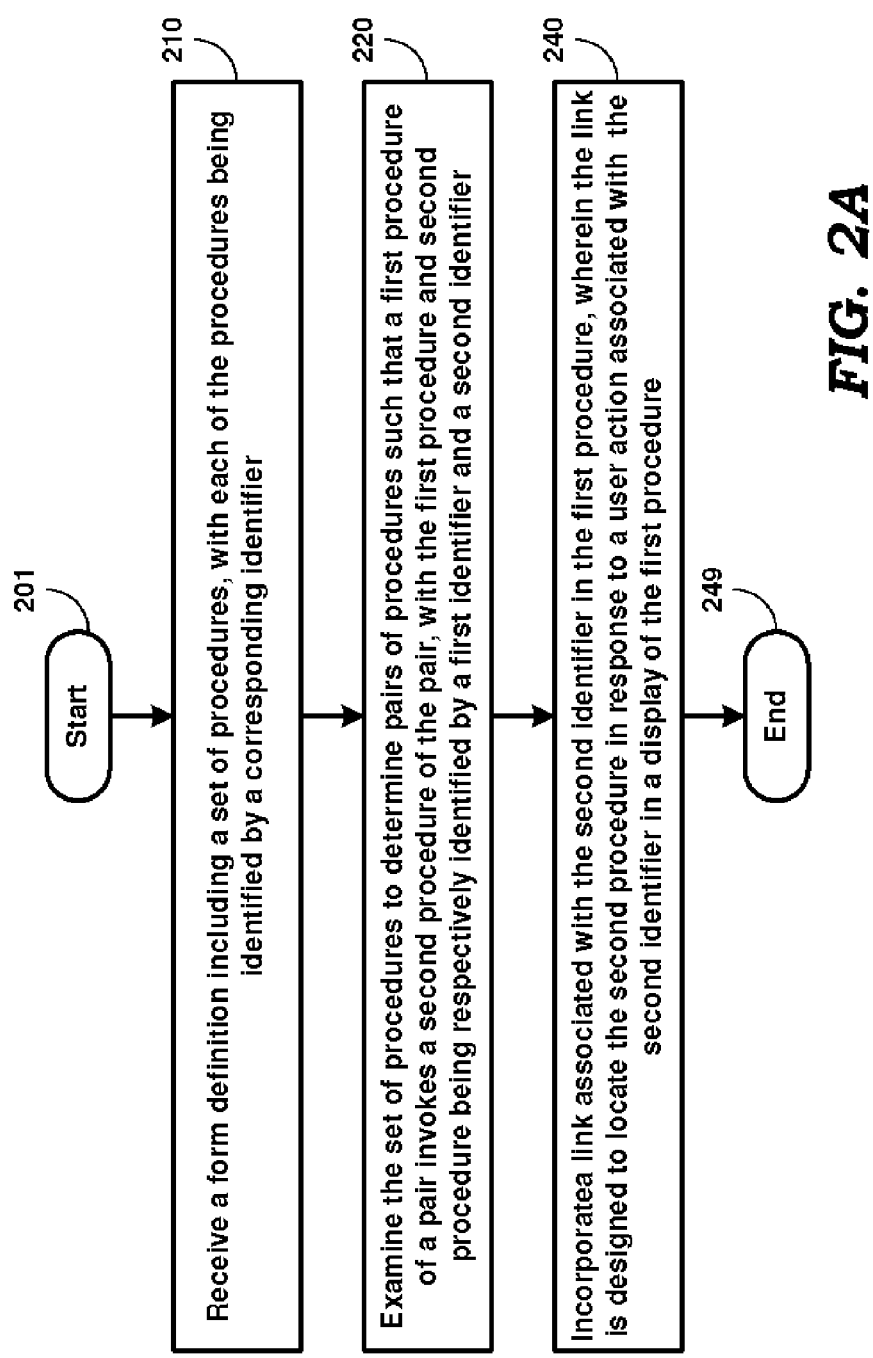
FIG. 2A is a flowchart illustrating the manner in which dependencies among the procedures in a form definition are determined according to several aspects of the present invention.

According to an aspect of the present invention, a form definition including a set of procedures (each procedure being identified by a corresponding identifier) is examined to determine pairs of procedures such that a first procedure (identified by a first identifier) in a pair invokes a second procedure (identified by a second identifier) of the pair. A link associated with the second identifier is included in the first procedure, with the link being designed to display the second procedure in response to a user action associated with the second identifier in a display of the first procedure.

According to another aspect of the present invention, the first procedure is defined for execution in a first system on which a user interface corresponding to the form definition is being provided. The second procedure is defined for execution in a second system. In an embodiment, the second system is a database server, which also stores the data operated upon (store, modify, delete, etc,) by using the user interface corresponding to the form definition.

According to yet another aspect of the present invention, the set of procedures are converted to a user readable form (e.g., text) in the scenario where the set of procedures is stored in a non-user readable format (e.g., binary) in the form definition. The link noted above is added to set of procedures in the user readable form to generate modified procedures. The converted procedures and the corresponding modified procedures are stored in a non-volatile memory such as a relational database. Due to such storing, any software instructions, which may be required to convert the procedures from non-readable format to the readable format, may not be required when a user merely needs to view the procedures to understand the various dependencies.

According to another aspect of the present invention, a first modified procedure is retrieved from the non-volatile memory and displayed to a user. The link (identifying a second procedure invoked from the first procedure) added to the first modified procedure is displayed as a display portion in a style indicating that the second procedure may be viewed by selecting the display portion. On receiving an indication that the display portion is selected, the modified instructions corresponding to the second procedure are retrieved and displayed.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

Example Environment

FIG. 1 is a block diagram illustrating an example environment in which various aspects of the present invention can be implemented. The block diagram is shown containing client systems 110A-110C, network 130, extractor tool 150, form explorer 160, and database server 170. Merely for illustration, only representative number/type of systems is shown in the Figure. Many environments often contain many more systems, both in number and type, depending on the purpose for which the environment is designed. Each system/device of FIG. 1 is described below in further detail.

Network 130 provides connectivity between various client systems 110A-110C, extractor tool 150, form explorer 160 and database server 170. Network 130 may be implemented using protocols such as Internet Protocol (IP) well known in the relevant arts. Database server 170 facilitates storage and retrieval of data using structured queries such as SQL in the case of relational database technologies.

Each of client systems 110A-110C represents a system such as a personal computer, workstation, mobile station, etc., and is used by a user to generate requests to database server 170 for performing various operations. The requests may be generated according to a suitable user interfaces as defined by form definitions stored in the corresponding client system (or retrieved from a convenient central shared location).

Extractor tool 150 retrieves form definitions from one of client systems 110A-110C and processes the data to simplify understanding of procedure dependencies according to several aspects of the present invention. Though shown independently, extractor tool 150 may be integrated with one of client systems 110A-110C and/or with form explorer 160. In one embodiment, extractor tool 150 receives the form definition in a non-user readable format (e.g., binary), converts the procedures in the form definition to a user-readable format, and stores the converted information along with links described in sections below, in database server 170.

Form explorer 160 enables a user (using one of client systems 110A-110C) to view the various procedures in a form definition using the information stored in database server 170. The description is continued illustrating the manner in which, extractor tool 150 processes the form definitions to determine the procedure dependencies.

Determining Procedure Dependencies

FIG. 2A is a flowchart illustrating the manner in which dependencies among the procedures in a form definition are determined according to several aspects of the present invention. The flowchart is described with respect to FIG. 1, and in relation to extractor tool 150, merely for illustration. However, various features can be implemented in other environments and other components also without departing from the scope and spirit of several aspects of the present invention, as will be apparent to one skilled in the relevant arts by reading the disclosure provided herein. The flow chart begins in step 201, in which control immediately passes to step 210.

In step 210, extractor tool 150 receives a form definition including a set of procedures, with each of the procedures being identified by a corresponding identifier. The form definition (and the procedures) may be retrieved from one of client systems 110A-110C. The retrieval of the procedures in a form definition generally depends on the environment of implementation. However, in one embodiment implemented in the context of Oracle 8i, the procedures may be retrieved from a form definition using JDAPI (Java Design-time API) described in detail in a document entitled, "Understanding JDAPI Architecture" available from Oracle International Incorporated, the intended assignee of the subject application.

In step 220, extractor tool 150 examines the set of procedures to determine pairs of procedures such that a first (or caller) procedure of a pair invokes a second (or called) procedure of the pair. A first identifier and a second identifier may respectively identify the first procedure and the second procedure.

In step 240, extractor tool 150 incorporates a link associated with the second identifier in the first procedure, wherein the link is designed to locate the second procedure in response to a user action associated with the second identifier in a display of the first procedure. For example, when a user selects the second identifier in the display of the first procedure, the instructions forming the second procedure may be located and retrieved, thereby forming the basis for viewing the second procedure. The data representing the procedures along with the link are referred to as modified procedures and is stored in database server 170 in one embodiment. The flowchart ends in step 249.

Thus, the dependencies among the set of procedures included in a form definition are determined and corresponding links incorporated. When a user selects a link (corresponding to a second procedure) in a display of a first procedure, the instructions forming the second procedure (located using the link) may be displayed as described in detail below.

Viewing Procedures in a Form Definition

Figure 2B:
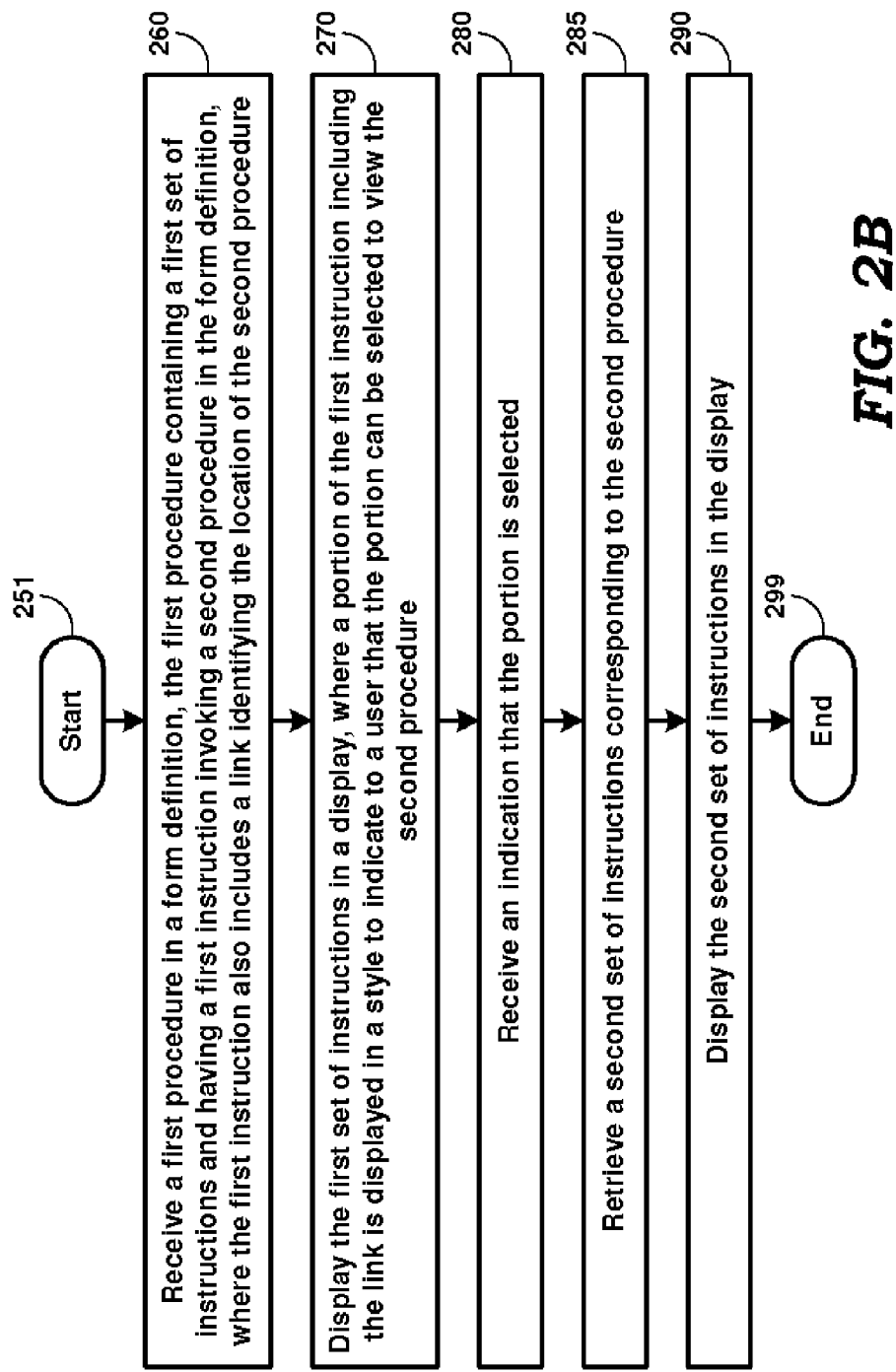
FIG. 2B is a flowchart illustrating the manner in which the procedures included in a form definition are viewed in an embodiment of the present invention.

FIG. 2B is a flowchart illustrating the manner in which the procedures included in a form definition are viewed according to several aspects of the present invention. The flowchart is described with respect to FIG. 1, and in relation to form explorer 160, merely for illustration. However, various features can be implemented in other environments and other components also without departing from the scope and spirit of several aspects of the present invention, as will be apparent to one skilled in the relevant arts by reading the disclosure provided herein. The flow chart begins in step 251, in which control immediately passes to step 260.

In step 260, form explorer 160 receives a first procedure in a form definition, the first procedure containing a first set of instructions and having a first instruction invoking a second procedure in the form definition, where the first instruction also includes a link identifying the location of the second procedure. The location may be specified using any convention that enables form explorer 160 to identify and retrieve the second procedure. The first procedure and the corresponding first set of instructions (including the link) may be retrieved from database server 170. The instructions retrieved may correspond to the instructions in the modified procedures generated in step 240 by extractor tool 150 (and stored in database server 170).

In step 270, form explorer 160 displays the first set of instructions in a display, where a portion of the first instruction including the link is displayed in a style to indicate to a user that the portion can be selected to view the second procedure. The display may be on a display unit (not shown) in one of client systems 110A-110C. In an embodiment described below, the first set of instructions contained in the first procedure are retrieved from database server 170 encoded in a hypertext markup language (HTML) and displayed in a HTML browser on the display unit. The portion of the first instruction (including the link) is displayed as a hyperlink, which is typically shown in a style defined by the HTML browser.

In step 280, form explorer 160 receives an indication that the portion is selected. In an embodiment where the link is displayed as a hyperlink, a user may click on the link indicating the selection of the portion of the first instruction. In step 285, form explorer 160 retrieves a second set of instructions corresponding to the second procedure. The second procedure may be retrieved using the location specified by the link. In step 290, form explorer 160 displays the second set of instructions in the display. It may be appreciated that the second procedure may be displayed on a display unit different from the display unit displaying the first procedure. The flow chart ends in step 299.

The features of FIGS. 2A and 2B can be implemented in environments having different implementation for form definitions. The description is continued with respect to an example implementation.

Form Definition in an Example Implementation

In one embodiment, the form definitions are stored in one or more of client systems 110A-110C. A form definition can include one or more types of procedures. Some type of procedures can operate on data and/or (meaning either individually or in combination) state already available/present associated with a form during use (in which case the procedures may be termed as form procedures). As an illustration, a validation procedure may verify that the data entered by a user conforms to some desired requirements such as minimum value.

Some other type of procedures may provide complex logic based on external data/state. Such complex logic may include desired business logic, and thus the procedures may be termed as business procedures. For example, a user management procedure may authenticate users, retrieve authorization information about the users and may maintain detailed records of the transactions performed by the user, typically in a database (such as database server 170).

It may be appreciated that some of the business procedures may be located within a database (such as database server 170). For example, a search procedure may be written using a programming language provided by a database to improve the efficiency of searches. Such procedures typically reside in the database and are executed by requesting the database to perform the appropriate procedure.

In operation, in such an embodiment, a form definition is used to display a form (to a user on a display unit, not shown, in one of client systems 110A-110C), including potentially any data that is defined to be retrieved from database server 170. The form definition may include form procedures that may be executed in the client systems and provide appropriate feedback to the users using the form.

In response to a user action (e.g., entry of data and selection of a submit button) associated with the form, a request is sent to a corresponding business procedure. The business procedure performs actions corresponding to the request and sends a response back to form. It may be appreciated that the business procedure may be executed in one of client systems 110A-110C (may be the same client system where the form is displayed) or in database server 170.

It may be appreciated that in an implementation, the form definition (including all the form and business procedures, display/interaction related components of the form definition) is provided as a single physical file. The physical file may be stored in a non-user readable format. An aspect of the present invention converts the software instructions contained in a procedure to a user-readable format before storing the procedures in a relational database (such as database server 170).

It may be further appreciated that by converting and storing the procedures (both form and business procedures) included in a form definition, a user may be enabled to view all the procedures together or to search for procedures of interest, further simplifying the task of understanding procedure dependencies in a form definition. The description is continued with an example illustrating the manner in which procedure dependencies are determined.

Illustrating Determining Procedure Dependencies

FIGS. 3A-3D, 4A-4B, together illustrates the manner in which dependencies among procedures in a form definition is determined in an example embodiment. For conciseness, only the portions of the Figures, as relevant to understanding the operation of the features sought to be illustrated, are described.

Figure 3A:
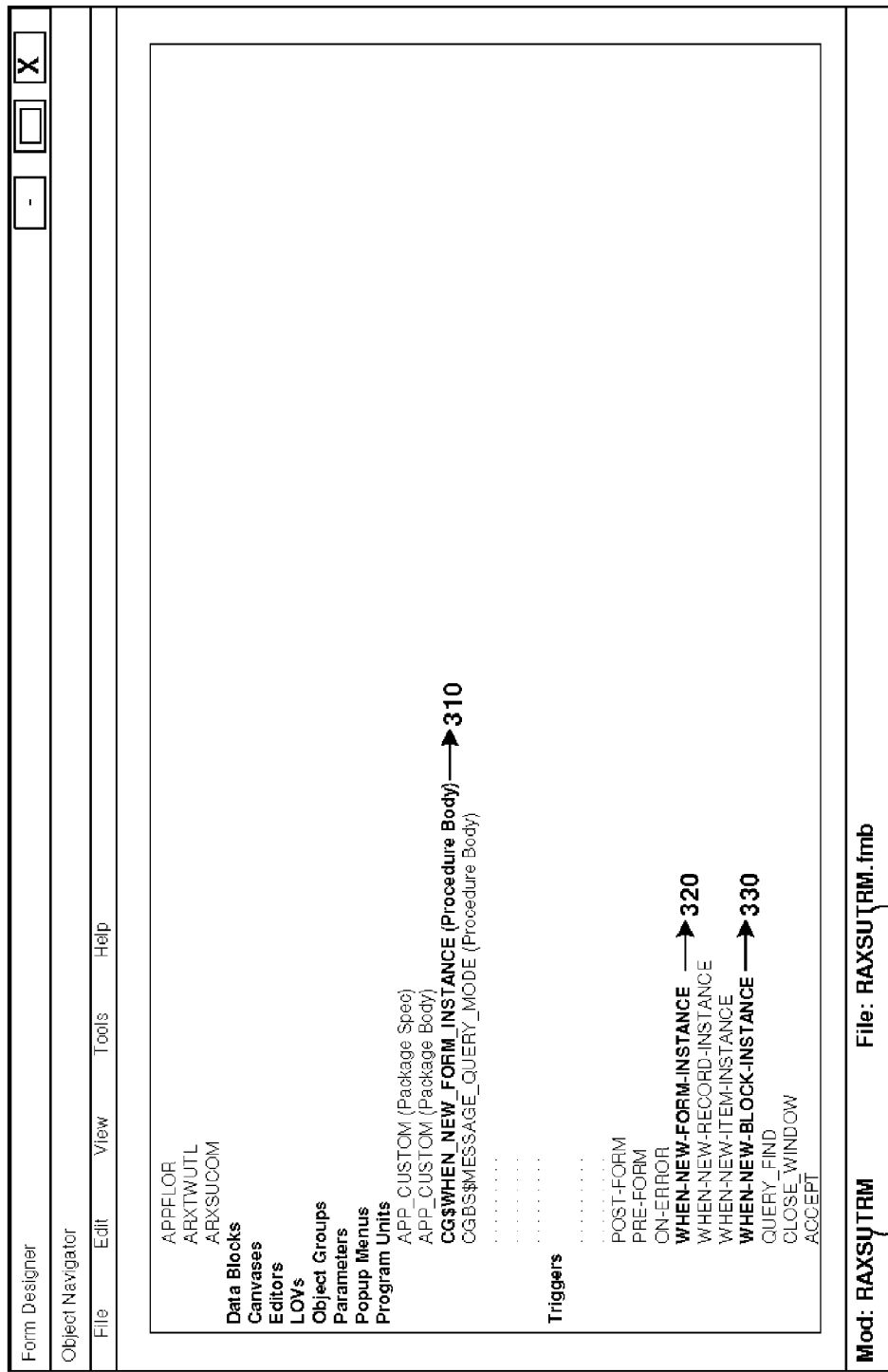
FIG. 3A depicts the various procedures associated with a form definition in an embodiment.

FIG. 3A depicts the various procedures associated with a form definition in an embodiment. Label 310 ("CG$WHEN_NEW_FORM_INSTANCE"), label 320 ("WHEN-NEW-FORM-INSTANCE") and label 330 ("WHEN-NEW-BLOCK-INSTANCE") represent identifiers of procedures that are associated with a form definition with name "RAXSUTRM" (as specified by label 340) and stored in a file (in a non-volatile memory) with name "RAXSUTRM.fmb" (as specified by label 350).

It may be observed that the procedures "WHEN-NEW-FORM-INSTANCE" and "WHEN-NEW-BLOCK-INSTANCE" are displayed under a category called "Triggers". Triggers typically represent form procedures that are executed in response to user actions involving elements of the form. Also, procedure "CG$WHEN_NEW_FORM_INSTANCE" is depicted classified under a category called "Program Units". Program units typically represent business procedures that are invoked from form procedures during the execution of the form definition.

Figure 3C:
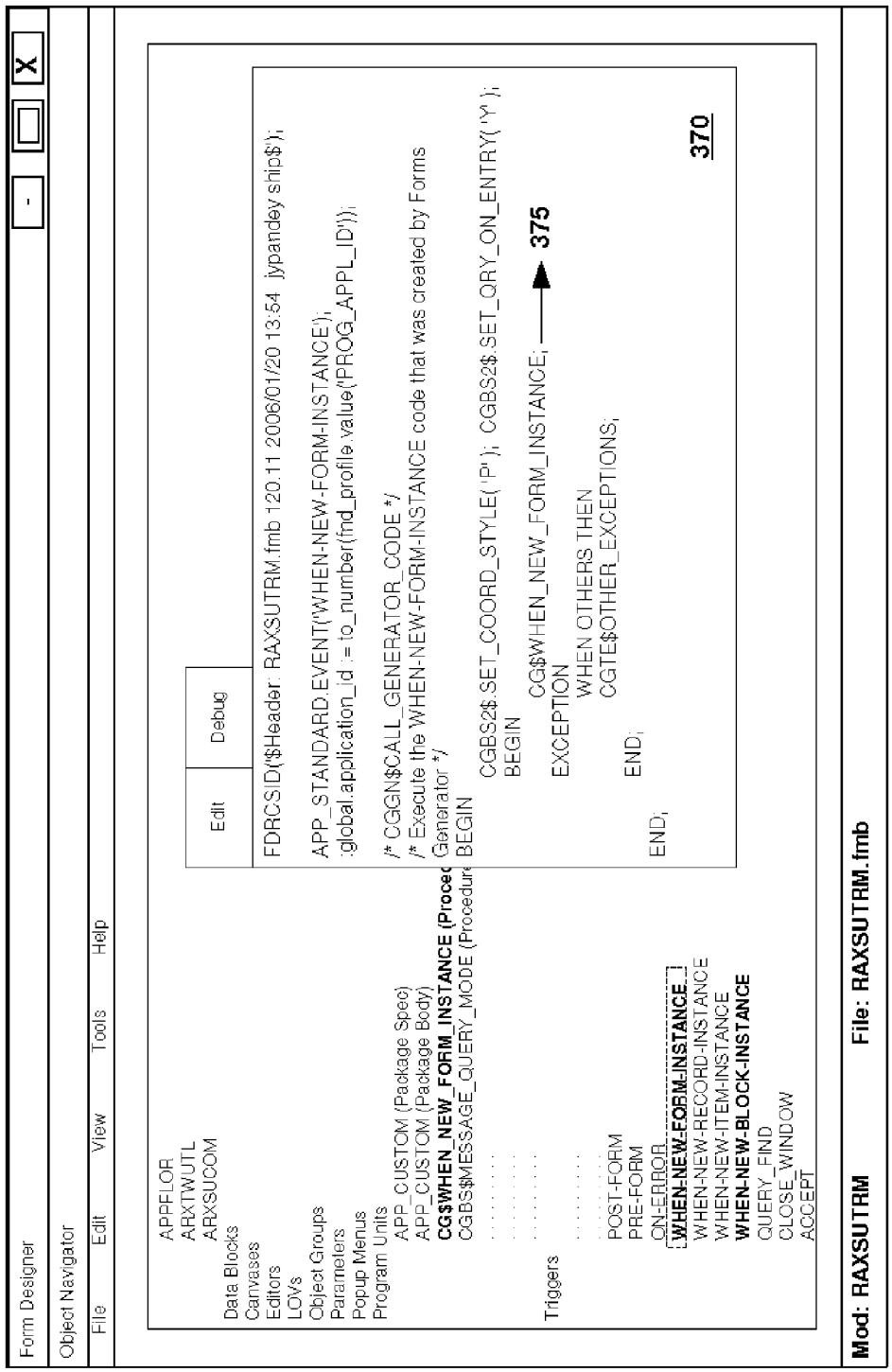
Figure 3D:
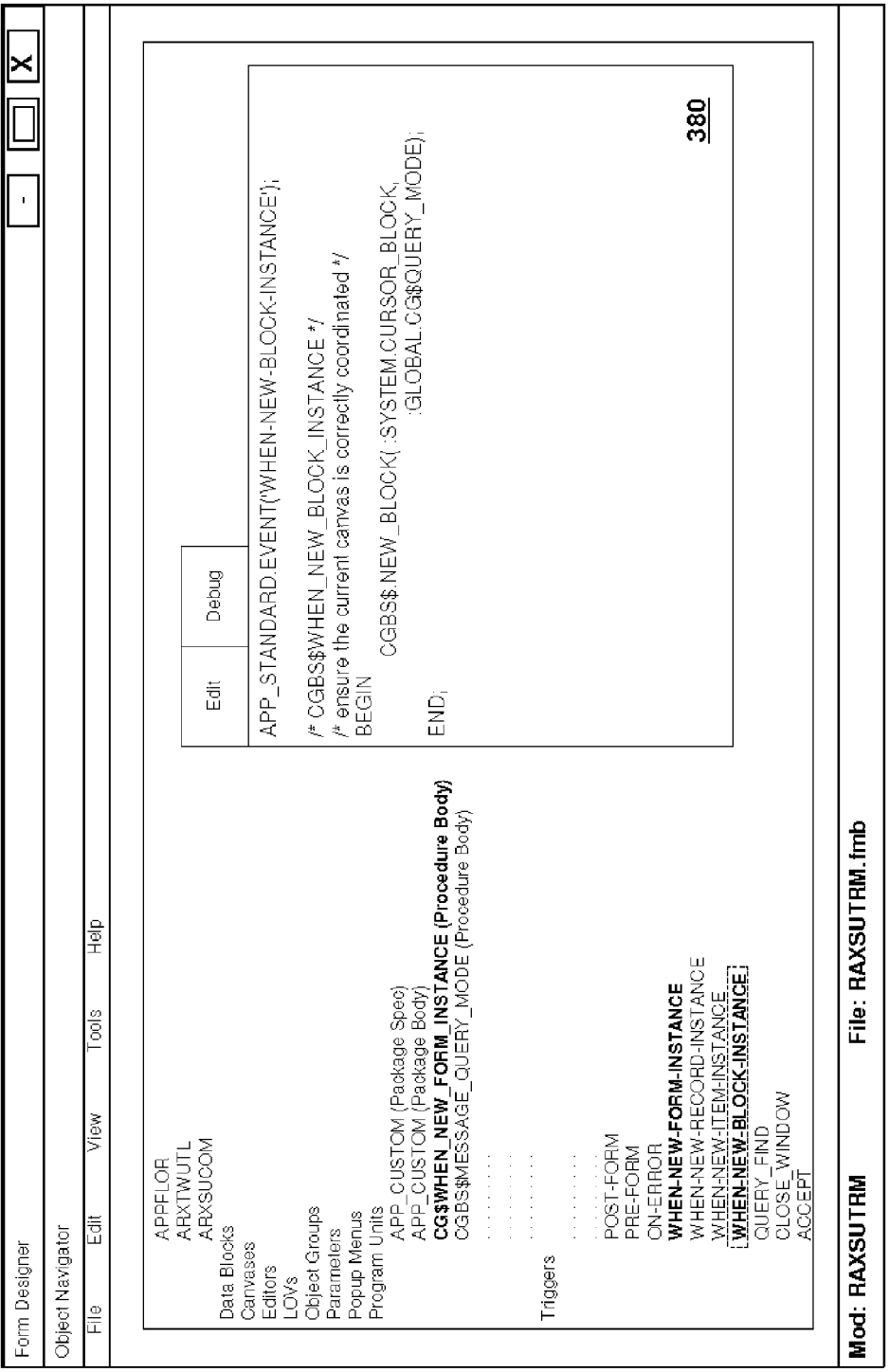

Each of FIGS. 3B, 3C and 3D depict the software instructions constituting a procedure (group of instructions) associated with a form definition in an embodiment. In FIG. 3B, text area 360 depicts the software instructions constituting a procedure with name "CG$WHEN_NEW_FORM_INSTANCE". Text area 360 may have been displayed in response to a user selecting label 310 in FIG. 3A, and enable the user to view and/or edit the software instructions constituting the selected procedure.

Similarly, text area 370 and 380 depict the software instructions constituting procedures with names "WHEN-NEW-FORM-INSTANCE" and "WHEN-NEW-BLOCK-INSTANCE" respectively and may have been displayed in response to a user selecting respective label 320 and label 330.

It may be observed that in text area 370, in line 375, the procedure "CG$WHEN_NEW_FORM_INSTANCE" is being invoked (or called) from the (caller) procedure "WHEN-NEW-FORM-INSTANCE". As such, it may be appreciated that a user may be required to search for the called procedure by using the corresponding identifier "CG$WHEN_NEW_FORM_INSTANCE" and then select the identifier in FIG. 3A to view the software instructions corresponding to the called procedure (as depicted in text area 360). An aspect of the present invention enables a user to directly access the called procedure from the caller procedure as described below.

Extractor tool 150 on receiving the above form definition (with name "RAXSUTRM") examines the procedures associated with the form definition. Extractor tool 150 determines a pair of procedures where a first procedure (depicted in text area 370) in the pair invokes a second procedure (depicted in text area 360) in the pair. A first identifier ("WHEN-NEW-FORM-INSTANCE") identifies the first procedure and a second identifier ("CG$WHEN_NEW_FORM_INSTANCE") identifies the second procedure.

Extractor tool 150 then (in step 240) includes a link associated with the second identifier "CG$WHEN_NEW_FORM_INSTANCE" in the first procedure (in line 375) such that the link is designed to retrieve the second procedure in response to a user action associated with the second identifier. In an embodiment, the procedures are modified to include markup language whereby the links are included as hyperlinks in the markup language.

It may be appreciated that the modified procedures may be displayed to a user, thereby enabling a user to view the instructions in a second procedure by clicking on a link (associated with the second procedure) from a display of a first procedure containing the link. The description is continued with an example illustrating the manner in which the procedures in a form definition are viewed.

Illustrating Viewing of Procedures

Figure 4A:
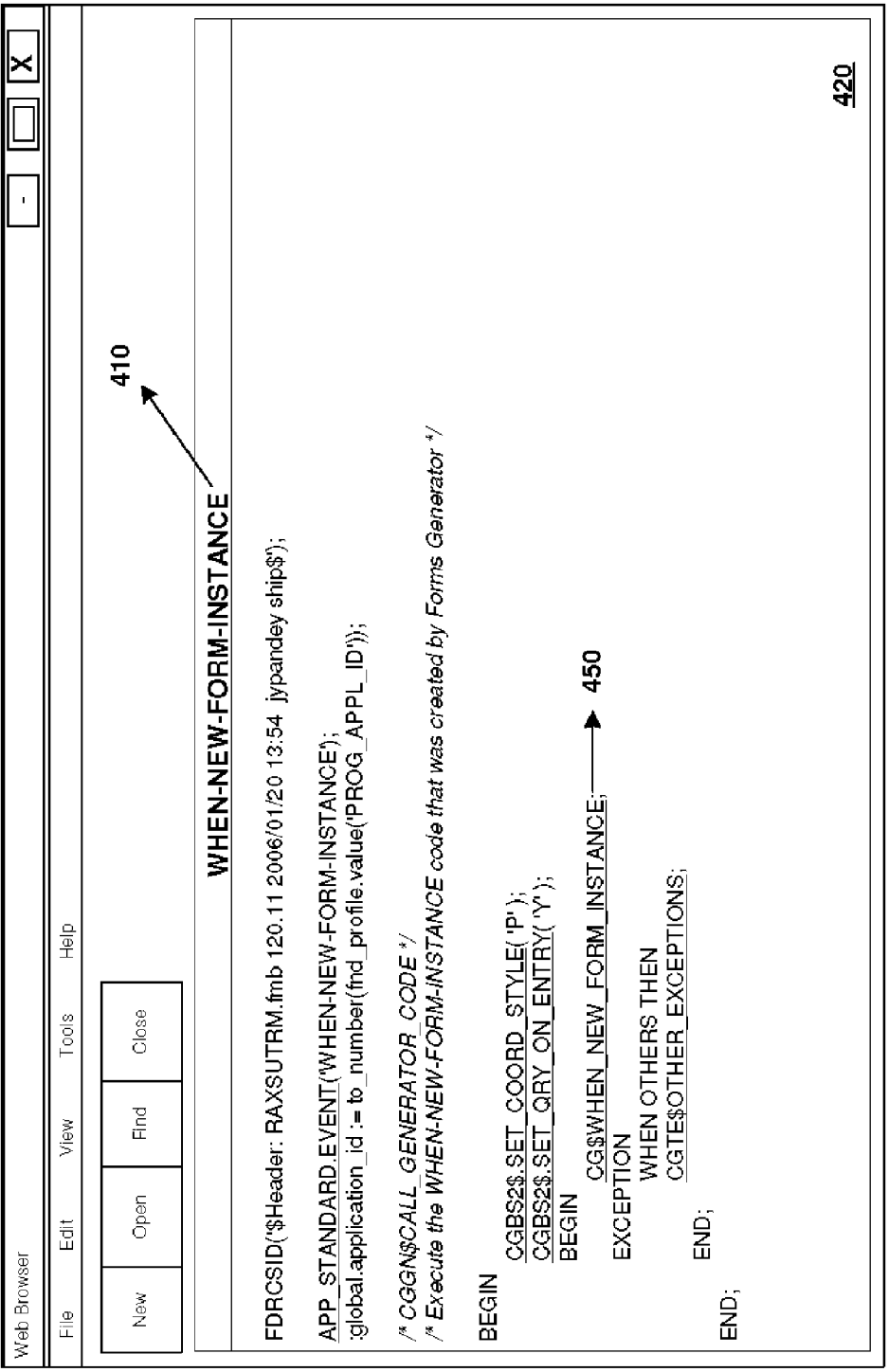
FIGS. 4A and 4B each depicts the software instructions constituting a procedure in a form definition encoded in a markup language (hyper text markup language or HTML) in an embodiment.
Figure 4B:
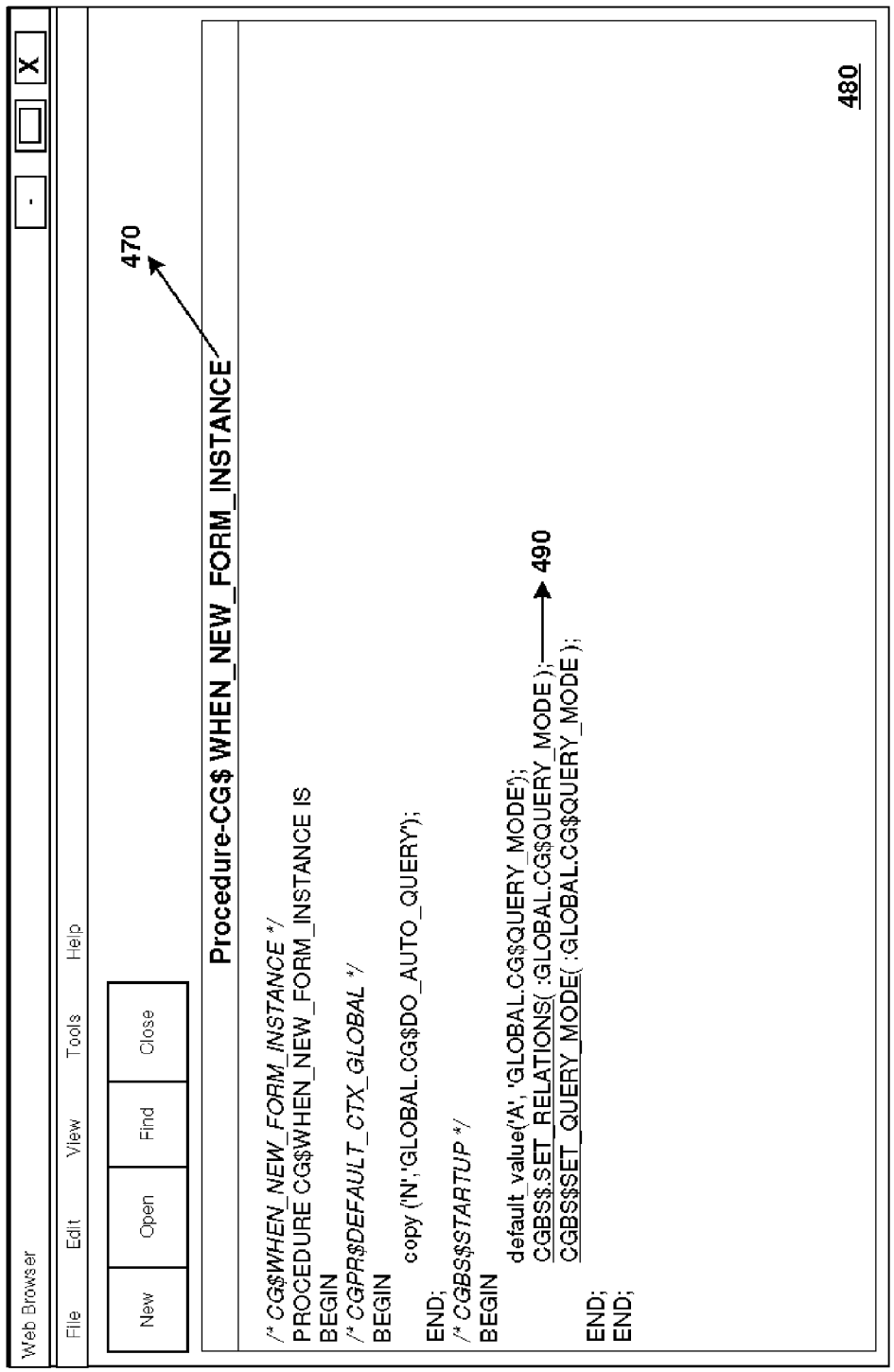

Each of FIGS. 4A and 4B depicts the display of software instructions constituting a procedure in a form definition encoded in a markup language (hyper text markup language or HTML) in an embodiment.

Broadly, a user (using one of clients systems 110A-110C) may request form explorer 160 to display the software instructions constituting a first procedure (by specifying an identifier identifying the first procedure). Form explorer 160 retrieves the instructions corresponding to the first procedure from database server 170 and sends it as a response to the requesting client system, where the retrieved instructions are displayed (as shown in FIG. 4A).

Display area 420 depicts the software instructions constituting a procedure (identified by label 410 "WHEN-NEW-FORM-INSTANCE") encoded in HTML. The content of display area 420 is similar to the contents of text area 370. Display portion 450 represents a hyperlink (shown as underlined) to a procedure identified by the identifier "CG$WHEN_NEW_FORM_INSTANCE" which is invoked during the execution of the procedure depicted in display area 420. It may be observed that display portion 450 is shown in a style (underlined) indicating (to a user) that display portion 450 may be selected to view the instructions contained in the procedure "CG$WHEN_NEW_FORM_INSTANCE". Though not shown, display portion 450 is associated with a location information ("href" attribute of a "<a>" tag used to provide hyperlinks in HTML) identifying the location of the procedure "CG$WHEN_NEW_FORM_INSTANCE".

On a user clicking display portion 450, an indication is sent to form explorer 160 indicating the selection of display portion 450. On receiving the indication, form explorer 160 retrieves the instructions corresponding to the procedure specified by the location associated with display portion 450. The retrieved instructions are sent to the requesting client system where they are displayed (as shown in FIG. 4B).

Display area 480 depicts the software instructions constituting the procedure identified by the identifier "CG$WHEN_NEW_FORM_INSTANCE" (as depicted in label 470). The content of display area 480 is similar to the content of text area 360. The hyperlink at display portion 490 may again be selected/clicked to display the instructions/identifier of the corresponding procedure.

Thus, a user may access a second procedure directly by clicking (or performing an appropriate action) associated with a second identifier (identifying the second procedure) from a modified first procedure invoking the second procedure. It may be appreciated that the modified procedures may be stored in a non-volatile memory and retrieved during display. The manner in which the determined procedures and the corresponding modified procedures are stored in an embodiment is described in detail below.

Storing Procedure Dependencies

FIGS. 5A and 5B together depict the procedures in a form definition and the corresponding modified procedures stored in an embodiment. The procedures are depicted as being stored in tables in database server 170. In alternative embodiments, the procedures may be stored in tables in a database different from database server 170.

Column 510 (labeled "FORM_ID") uniquely identifies each form definition in the database application. Column 520 (labeled "FORM_NAME") provides the name of the form definition. Column 530 (labeled "TRIGGER_NAME") uniquely identifies each of the procedures associated with a form definition.

Column 540 (labeled "ORIGINAL_TRIGGER_TEXT") depicts the software instructions constituting a procedure (identified by column 530) in user-readable format. These instructions may be generated from form definitions, which store procedure information in non-readable form (e.g., binary). As the converted data is in user-readable format, any procedures required for converting from non-user-readable format to user-readable format may not be required when the user is merely trying to understand procedure dependencies.

Column 550 (labeled "MARKEDUP_TRIGGER_TEXT") depicts the software instructions encoded in HTML constituting a modified procedure corresponding to a procedure (identified by column 530). The modified procedure is generated from the text in column 540. The data in column 550 is used in the displays of FIGS. 4A and 4B above. The data in column 540 may be used for searches.

Row 560 specifies a procedure (identified by the identifier "WHEN-NEW-FORM-INSTANCE") associated with a form definition (with name "RAXSUTRM" and a unique identifier "13910"). The software instructions constituting the procedure are shown in column 540 (of row 560) and are similar to the content of text area 370. The modified procedure (including the links to other procedures invoked by the procedure) is shown is column 550 (of row 560) and are used to generate the display corresponding to display area 420.

It may be observed that the contents of column 550 (of row 560) is encoded in HTML and contains a hyperlink "<a class="proglink" href=FormExtractionUIMain?page=singleProgramUnit&formId=13910&programUnitId=54245&programUnitName=CG$WHEN_NEW_FORM_INSTANCE&programUnitType=#CG$WHEN_NEW_FORM_INSTANCE>CG$WHEN_NEW_FORM_INSTANCE</a>" corresponding to display portion 430. It may be observed that the "href" attribute contains the portion of string "programUnitName=CG$WHEN_NEW_FORM_INSTANCE" identifying the procedure "CG$WHEN_NEW_FORM_INSTANCE" to be displayed when a user selects the hyperlink.

Row 570 specifies another procedure (identified by the identifier "CG$WHEN_NEW_FORM_INSTANCE") associated with the same form definition as row 560 (since the form identifier "13910" is the same as that of row 560). The software instructions constituting the procedure are shown in column 540 (of row 570) and are similar to the content of text area 360. The modified procedure (including the links to other procedures invoked by the procedure) is shown is column 550 (of row 560) and are used to generate the display corresponding to display area 480.

Similarly, row 580 specifies another procedure (identified by the identifier "WHEN-NEW-BLOCK-INSTANCE") associated with the same form definition as row 560 and has software instructions similar to the content depicted in text area 380. It may be appreciated that even the procedures that are not dependent on other procedures, are also converted to user-readable format and stored in the table.

It should further be appreciated that extractor tool 150 may be implemented in a combination of one or more of hardware, software and firmware. The description is continued with respect to an embodiment in which various features are operative by execution of corresponding software instructions.

Digital Processing System

Figure 6:
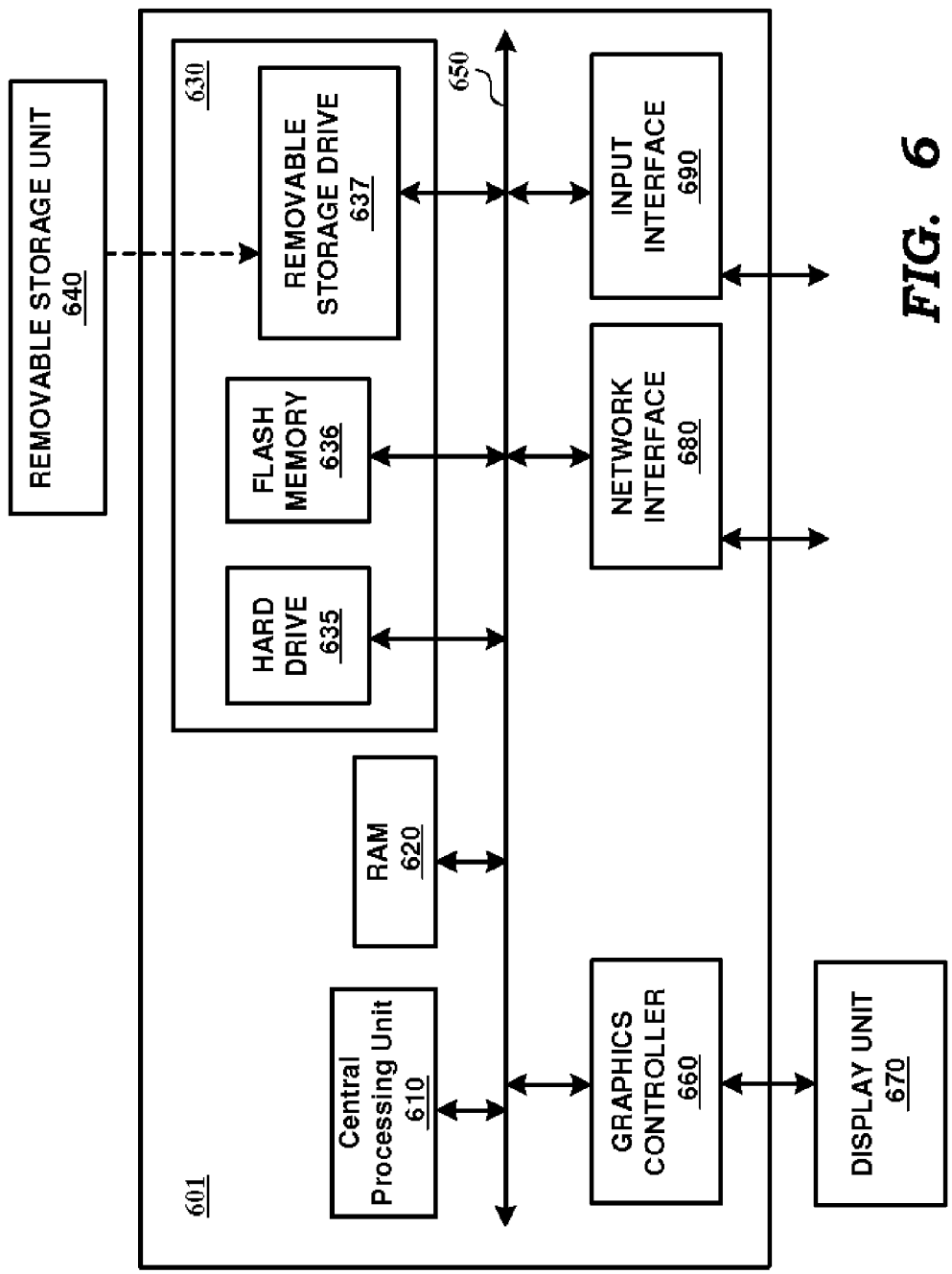
FIG. 6 is a block diagram illustrating the details of a digital processing system in one embodiment.

FIG. 6 is a block diagram illustrating the details of a digital processing system in one embodiment. Digital processing system 600 may correspond to extractor tool 150. Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions and data from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and/or mouse. Network interface 680 provides connectivity to a network (e.g., using Internet Protocol), and may be used to communicate with other external systems.

Secondary memory 630 may contain hard drive 635, flash memory 636, and removable storage drive 637. Secondary memory 630 may store the data and software instructions, which enable system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However computer readable medium can include other memory units such as RAM (random access and/or volatile) and non-removable units as well.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of facilitating understanding of procedure dependencies in form definitions, said method being performed in a digital processing system, said method comprising:

receiving a form definition, wherein said form definition being already enabled to provide a user interface on display screens as a corresponding form to users, wherein said received form definition includes a plurality of procedures, each of said plurality of procedures containing a corresponding group of software instructions, which upon execution are operative to provide said user interface as said corresponding form, wherein each of said plurality of procedures is identified by a corresponding one of a plurality of identifiers, each software instruction being in the form of a text in said form definition, said plurality of procedures including a first procedure and a second procedure, respectively identified by a first identifier and a second identifier of said plurality of identifiers, said second identifier being in the form of a second text and said first procedure containing a software instruction to invoke said second procedure, said software instruction containing said second text to identify said second procedure sought to be invoked;

examining the text forming the corresponding group of software instructions contained in each of said plurality of procedures to determine a plurality of pairs of procedures, wherein one procedure in a pair is designed to invoke the other procedure of the pair as said user interface is provided on display screens as said corresponding form based on said form definition, wherein said examining determines said first procedure and said second procedure together as one of said plurality of pairs of procedure in view of said software instruction of said first procedure containing said second text identifying said second procedure;

incorporating a hyperlink associated with said second text in said software instruction of said first procedure in response to said determination of said pair, wherein said hyperlink is enabled to retrieve the corresponding group of software instructions constituting said second procedure and display the retrieved group of software instructions to a user in response to a user action associated with a display of said second text by said user;

displaying a listing of software instructions constituting said first procedure, said listing of software instructions containing software instructions including said software instruction as received in said form definition, wherein said second text in said listing of software instructions is displayed in a style indicating that said hyperlink is associated with said second text, and wherein a second set of software instructions in said listing are displayed in another style indicating that none of said second set of software instructions are associated with hyperlinks;

receiving an indication that said hyperlink has been activated by said user in view of said user performing said user action associated with said second text contained in said displayed listing; and in response to receiving of said indication, retrieving a second group of software instructions constituting said second procedure and displaying the retrieved second group of software instructions, wherein the displayed second group of software instructions contain an identifier of said second procedure matching said second text, said second group of software instructions containing software instructions as received in said form definition.

2. The method of claim 1, further comprising modifying said first procedure to generate a first modified procedure, wherein said first modified procedure is formed by adding said hyperlink in said first procedure.

3. The method of claim 2, wherein said hyperlink is provided according to a markup language, wherein said hyperlink further contains an information to retrieve said second group of software instructions, wherein said indication indicates that said user has clicked on said hyperlink.

4. The method of claim 2, wherein each of said plurality of procedures is in a non-user readable form in a storage storing said form definition, said method further comprising:
converting each of said plurality of procedures into a user readable form as said corresponding group of software instructions, wherein said hyperlink is included in said first procedure in said user readable form; and
storing said plurality of procedures in said user readable form in a non-volatile memory, wherein said storing also stores said first modified procedure in said non-volatile memory.

5. The method of claim 4, wherein said non-volatile memory is a relational database containing a first column for said plurality of procedures and a second column for modified procedures, wherein said first procedure is stored in a same row as said first modified procedure.

6. The method of claim 1, wherein said first procedure is defined for execution in a first system on which a user interface corresponding to said form definition is provided, and said second procedure is defined for execution in a second system, wherein said first system and said second system are implemented as different physical units.

7. The method of claim 6, wherein said second system comprises a database server also storing said form definition.

8. A non-transitory computer readable medium storing one or more sequences of instructions for causing a system to facilitate understanding of procedure dependencies in form definitions, wherein execution of said one or more sequences of instructions by one or more processors contained in said system causes said system to perform the actions of:
receiving a form definition, wherein said form definition being already enabled to provide a user interface on display screens as a corresponding form to users,
wherein said received form definition includes a plurality of procedures, each of said plurality of procedures containing a corresponding group of software instructions, which upon execution are operative to provide said user interface as said corresponding form,
wherein each of said plurality of procedures is identified by a corresponding one of a plurality of identifiers, each software instruction being in the form of a text in said form definition,
said plurality of procedures including a first procedure and a second procedure, respectively identified by a first identifier and a second identifier of said plurality of identifiers, said second identifier being in the form of a second text and said first procedure containing a software instruction to invoke said second procedure, said software instruction containing said second text to identify said second procedure sought to be invoked;
examining the text forming the corresponding group of software instructions contained in each of said plurality of procedures to determine a plurality of pairs of procedures, wherein one procedure in a pair is designed to invoke the other procedure of the pair as said user interface is provided on display screens as said corresponding form based on said form definition,
wherein said examining determines said first procedure and said second procedure together as one of said plurality of pairs of procedure in view of said software instruction of said first procedure containing said second text identifying said second procedure;
incorporating a hyperlink associated with said second text in said software instruction of said first procedure in response to said determination of said pair, wherein said hyperlink is enabled to retrieve the corresponding group of software instructions constituting said second procedure and display the retrieved group of software instructions to a user in response to a user action associated with a display of said second text by said user;
displaying a listing of software instructions constituting said first procedure, said listing of software instructions containing software instructions including said software instruction as received in said form definition, wherein said second text in said listing of software instructions is displayed in a style indicating that said hyperlink is associated with said second text, and wherein a second set of software instructions in said listing are displayed in another style indicating that none of said second set of software instructions are associated with hyperlinks;
receiving an indication that said hyperlink has been activated by said user in view of said user performing said user action associated with said second text contained in said displayed listing; and
in response to receiving of said indication, retrieving a second group of software instructions constituting said second procedure and displaying the retrieved second group of software instructions, wherein the displayed second group of software instructions contain an identifier of said second procedure matching said second text, said second group of software instructions containing software instructions as received in said form definition.

9. The non-transitory computer readable medium of claim 8, further comprising one or more instructions for:
modifying said first procedure to generate a first modified procedure, wherein said first modified procedure is formed by adding said hyperlink to the identifier of said second procedure called in said first procedure, wherein said hyperlink is provided according to a markup language, wherein said hyperlink further contains an information to retrieve said second group of software instructions, wherein said receiving receives said indication upon said user clicking said hyperlink, wherein said user action comprises a click on said hyperlink.

10. The non-transitory computer readable medium of claim 9, wherein each of said plurality of procedures is in a non-user readable form in a storage storing said form definition, said method further comprising one or more instructions for:
converting each of said plurality of procedures into a user readable form as said corresponding group of software instructions, wherein said hyperlink is included in said first procedure in said user readable form; and
storing said plurality of procedures in said user readable form in a non-volatile memory, wherein said storing also stores said first modified procedure in said non-volatile memory.

11. The non-transitory computer readable medium of claim 10, wherein said non-volatile memory is a relational database containing a first column for said plurality of procedures and a second column for modified procedures, wherein said first procedure is stored in a same row as said first modified procedure.

12. The non-transitory computer readable medium of claim 8, wherein said first procedure is defined for execution in a first system on which a user interface corresponding to said form definition is provided, and said second procedure is defined for execution in a second system, wherein said first system and said second system are implemented as different physical units.

13. A system for facilitating understanding of procedure dependencies in form definitions, said system comprising:
a memory to store a set of instructions; and
one or more processors to retrieve and execute said set of instructions to cause said system to perform the actions of:
receiving a form definition, wherein said form definition being already enabled to provide a user interface on display screens as a corresponding form to users, wherein said received form definition includes a plurality of procedures, each of said plurality of procedures containing a corresponding group of software instructions, which upon execution are operative to provide said user interface as said corresponding form,
wherein each of said plurality of procedures is identified by a corresponding one of a plurality of identifiers, each software instruction being in the form of a text in said form definition,
said plurality of procedures including a first procedure and a second procedure, respectively identified by a first identifier and a second identifier of said plurality of identifiers, said second identifier being in the form of a second text and said first procedure containing a software instruction to invoke said second procedure, said software instruction containing said second text to identify said second procedure sought to be invoked;
examining the text forming the corresponding group of software instructions contained in each of said plurality of procedures to determine a plurality of pairs of procedures, wherein one procedure in a pair is designed to invoke the other procedure of the pair as said user interface is provided on display screens as said corresponding form based on said form definition,
wherein said examining determines said first procedure and said second procedure together as one of said plurality of pairs of procedure in view of said software instruction of said first procedure containing said second text identifying said second procedure;
incorporating a hyperlink associated with said second text in said software instruction of said first procedure in response to said determination of said pair, wherein said hyperlink is enabled to retrieve the corresponding group of software instructions constituting said second procedure and display the retrieved group of software instructions to a user in response to a user action associated with a display of said second text by said user;
displaying a listing of software instructions constituting said first procedure, said listing of software instructions containing software instructions including said software instruction as received in said form definition, wherein said second text in said listing of software instructions is displayed in a style indicating that said hyperlink is associated with said second text, and wherein a second set of software instructions in said listing are displayed in another style indicating that none of said second set of software instructions are associated with hyperlinks;
receiving an indication that said hyperlink has been activated by said user in view of said user performing said user action associated with said second text contained in said displayed listing; and
in response to receiving of said indication, retrieving a second group of software instructions constituting said second procedure and displaying the retrieved second group of software instructions, wherein the displayed second group of software instructions contain an identifier of said second procedure matching said second text, said second group of software instructions containing software instructions as received in said form definition.

14. The system of claim 13, wherein said actions further comprise:
receiving said first group of software instructions corresponding to said first procedure, including a hyperlink associated with said software instruction, wherein said hyperlink identifies a location where said second group of software instructions corresponding to said second procedure are located; and
retrieving said second group of software instructions corresponding to said second procedure from said location in response to said receiving said indication.

15. The system of claim 14, wherein the software instructions displayed for said first procedure and said second procedure are according to a programming language in human readable form.

16. The method of claim 1, wherein the software instructions displayed for said first procedure and said second procedure are according to a programming language in human readable form.

17. The non-transitory computer readable medium of claim 8, wherein the software instructions displayed for said first procedure and said second procedure are according to a programming language in human readable form.

18. The computer readable medium of claim 8, wherein said second group of software instructions corresponding to said second procedure are displayed next to said listing of software instructions on a same display screen, and wherein said listing of software instructions is displayed in a web browser.

* * * * *